(12) United States Patent
Nomura et al.

(10) Patent No.: US 12,064,935 B2
(45) Date of Patent: Aug. 20, 2024

(54) AEROMORPH SHAPE MANAGEMENT

(71) Applicant: Toyota Motor Engineering & Manufacturing North America, Inc., Plano, TX (US)

(72) Inventors: Tsuyoshi Nomura, Novi, MI (US); Yuqing Zhou, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 688 days.

(21) Appl. No.: 17/155,395

(22) Filed: Jan. 22, 2021

(65) Prior Publication Data

US 2022/0194044 A1 Jun. 23, 2022

Related U.S. Application Data

(60) Provisional application No. 63/129,058, filed on Dec. 22, 2020.

(51) Int. Cl.
*B31B 50/60* (2017.01)
*B29L 31/00* (2006.01)
(Continued)

(52) U.S. Cl.
CPC ............ *B31B 50/60* (2017.08); *B31D 5/0073* (2013.01); *F16K 15/20* (2013.01); *B29L 2031/7138* (2013.01); *B65D 81/052* (2013.01)

(58) Field of Classification Search
CPC ....... B31B 50/60; B31D 5/0073; F16K 15/20; B29L 2031/7138; B65D 81/052
See application file for complete search history.

(56) References Cited

U.S. PATENT DOCUMENTS 9,140,649 B2 9/2015 Hart et al.
9,777,753 B2 10/2017 Niiyama et al.
(Continued)

OTHER PUBLICATIONS

JamSheets: Thin Interfaces with Tunable Stiffness Enabled by Layer Jamming. J Ou, L Yao, D Tauber, J Steimle, R Niiyama, H Ishii; TEI '14: Proceedings of the 8th International Conference on Tangible, Embedded and Embodied Interaction Feb. 2014; p. 65-72; https://doi.org/10.1145/2540930.2540971 (Year: 2014).*

(Continued)

*Primary Examiner* — George R Koch
(74) *Attorney, Agent, or Firm* — Christopher G. Darrow; Darrow Mustafa PC (57) ABSTRACT

Inflatable structures, or aeromorphs, are provided with reinforcing member shape controlling features. The inflatable structure includes a bladder formed of a programmable substrate and defining an outer perimeter. The bladder includes a plurality of seams and a plurality of foldable segments defined by the plurality of seams. At least one hinge is provided, located adjacent each foldable segment. The hinge is configured to permit a folding movement of the respective foldable segment. At least one reinforcing member is provided, secured to the bladder and configured to guide a directional movement of at least one of the plurality of foldable segments, control a shape of the inflatable structure, and determine a sequence of folding. In various aspects, the reinforcing member includes a thermoplastic polyurethane, and is secured to a surface of the bladder with additive manufacturing techniques, such as 3-D printing.

20 Claims, 6 Drawing Sheets

(51) Int. Cl.
  *B31D 5/00* (2017.01)
  *B65D 81/05* (2006.01)
  *F16K 15/20* (2006.01)

(56) References Cited

U.S. PATENT DOCUMENTS 10,337,536 B2  7/2019  Niiyama et al.
10,363,670 B1  7/2019  Gundling

OTHER PUBLICATIONS

PneUI: pneumatically actuated soft composite materials for shape changing interfaces, L Yao, R Niiyama, J Ou, S Follmer, C Della Silva, H Ishii; UIST '13: Proceedings of the 26th annual ACM symposium on User interface software and technology; Oct. 2013 pp. 13-22; https://doi.org/10.1145/2501988.2502037 (Year: 2013).*
Printflatables: printing human-scale, functional and dynamic inflatable objects, H Sareen, U Umapathi, P Shin, Y Kakehi, J Ou, H Ishii, P Maes, CHI '17: Proceedings of the 2017 CHI Conference on Human Factors in Computing Systems; May 2017 p. 3669-3680https://doi.org/10.1145/3025453.3025898 (Year: 2017).*
Ou, J. et al., "aeroMorph—Heat-sealing Inflatable Shape-change Materials for Interaction Design", Massachusetts Institute of Technology, Oct. 16, 2016, 12 pages.
Seal Master Corporation, "Reinforced Inflatable Bags," https://www.sealmaster.com/products/reinforced-inflatable-bags (last downloaded Feb. 19, 2020), 6 pages.

* cited by examiner

AEROMORPH SHAPE MANAGEMENT

CROSS-REFERENCE TO RELATED APPLICATION

This application claims the benefit of U.S. Provisional Patent Application Ser. No. 63/129,058, filed Dec. 22, 2020, the contents of which are incorporated herein in their entirety.

TECHNICAL FIELD

The present disclosure generally relates to aeromorph structures and, more particularly, to the addition of reinforcing members to aeromorph structures for controlled folding, wrinkling, and shape management.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

An aeromorph structure is an inflatable device that generally begins as a flat, 2-D bladder, which transforms into a 3-D shape upon inflation with a fluid, such as air. With conventional aeromorph technology, two sheets of a programmable substrate, such as fabric, paper, plastic, and the like, are secured with seams and/or seals to form air pockets at predetermined locations. When inflation of the aeromorph structure begins, portions of the structure take shape based on the pattern of seams and/or seals. The final shape and design of the aeromorph structure can vary based on the precise control of folding, including both the direction and angle, as well as the timing of the folding with respect to a series of folds. The more complex the shape, however, the more difficult it becomes to control the directional folding. For example, in designs where a portion of the aeromorph structure can fold in more than one direction, it can be difficult to consistently prevent an undesired directional folding. Still further, wrinkles that may form on sides of the aeromorph structure can influence the manner of folding.

While current aeromorph structures exhibit promising features in terms of providing complex inflatable shapes and designs, there remains a need for improved control of folding and wrinkling related to shape management of aeromorph structures.

SUMMARY

This section provides a general summary of the disclosure, and is not a comprehensive disclosure of its full scope or all of its features.

In various aspects, the present teachings provide an inflatable structure with shape controlling features. The inflatable structure includes a bladder formed of a programmable substrate and defining an outer perimeter. The bladder includes a plurality of seams and a plurality of foldable segments defined, at least in part, by the plurality of seams. At least one hinge is provided, located adjacent each foldable segment. The hinge is configured to permit a folding movement of the respective foldable segment. At least one reinforcing member is provided, secured to an exterior surface of the bladder and configured to guide a directional movement of at least one of the plurality of foldable segments and control a shape of the inflatable structure, including determining a sequence of folding. In various aspects, the reinforcing member includes a thermoplastic polyurethane, and can be secured to a surface of the bladder with additive manufacturing techniques, such as 3-D printing.

In other aspects, the present teachings provide a method of forming an inflatable structure with a plurality of chambers that can be selectively shaped. The method includes providing two layers of a programmable material, with each layer defining an exterior facing major surface and an interior facing major surface. The interior major surfaces may include a thermoplastic polyurethane. The method includes joining the two layers of the programmable substrate to form a bladder. A plurality of seams can be formed in the bladder to define a plurality of foldable segments. The method includes defining a plurality of hinges configured to permit a folding movement of the respective foldable segments. At least one reinforcing member is deposited on a portion of one of the exterior facing major surfaces. The reinforcing member exhibits a stiffness greater than a stiffness of the programmable material. The reinforcing member is configured to guide a directional movement of at least one of the plurality of foldable segments, control a shape of the inflatable structure, and determine a sequence of folding.

In still further aspects, the present teachings provide a method of controlling a sequence of folding a plurality of segments of an inflatable structure. The method includes joining two layers of a programmable material to form a bladder, and then forming a plurality of seams in the bladder to define a plurality of foldable segments. A plurality of hinges are defined, configured to permit a folding movement of the respective foldable segments. The method includes depositing a first reinforcing member having a first stiffness value on an exterior facing major surface of a first foldable segment, and depositing a second reinforcing member having a second stiffness value, greater than the first stiffness value, on an exterior facing surface of a second foldable segment. During inflation of the inflatable structure, the first and second foldable segments move in a sequence, where the first foldable segment bends before the second foldable segment.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide improvements to soft, shape-changing devices known as aeromorphs, also generally referred to herein as inflatable structures. An aeromorph is intended to be a pneumatically actuated, self-folding structure. In various examples, an aeromorph includes a pouch, or bladder, made of a programmable substrate (i.e., layers of a programmable material or fabric) that is provided with various patterns of seams and pneumatic hinges. When the bladder is inflated, air pockets form in foldable segments that subsequently bend and change in shape based on the precise design and location of the seams and hinges. The inflation process is often completed in a manner of seconds. With complex shapes and designs, it can be challenging to consistently inflate an aeromorph with each segment having the intended fold direction in order to obtain the desired final shape. Wrinkles that form in portions of the different segments of the bladder may negatively influence the folding direction(s). With certain designs, it can also be challenging to control the specific sequence in which segments fold. Prior designs have included single-use mechanical bands or constraints that result in explosive popping transformations to control a sequence of folding; however, this does not permit repeated inflation and deflation.

In various aspects, the present teachings provide an inflatable structure with reinforcing member features that influence and manage the shape changes. The reinforcing member features can be useful for minimizing or controlling the formation of wrinkles, influencing the directions of folding, and determining/controlling a sequence of the folding of different segments. As will be described in more detail below, the inflatable structure generally includes a bladder formed of a programmable substrate. The bladder includes a plurality of seams and a plurality of foldable segments defined by the plurality of seams. At least one pneumatic hinge is provided, located adjacent each foldable segment. The hinge is configured to permit a folding movement of the respective foldable segment. At least one reinforcing member is provided, secured to an exterior surface of the bladder and configured to guide a directional movement of at least one of the plurality of foldable segments and control a shape of the inflatable structure.

Figure 1:
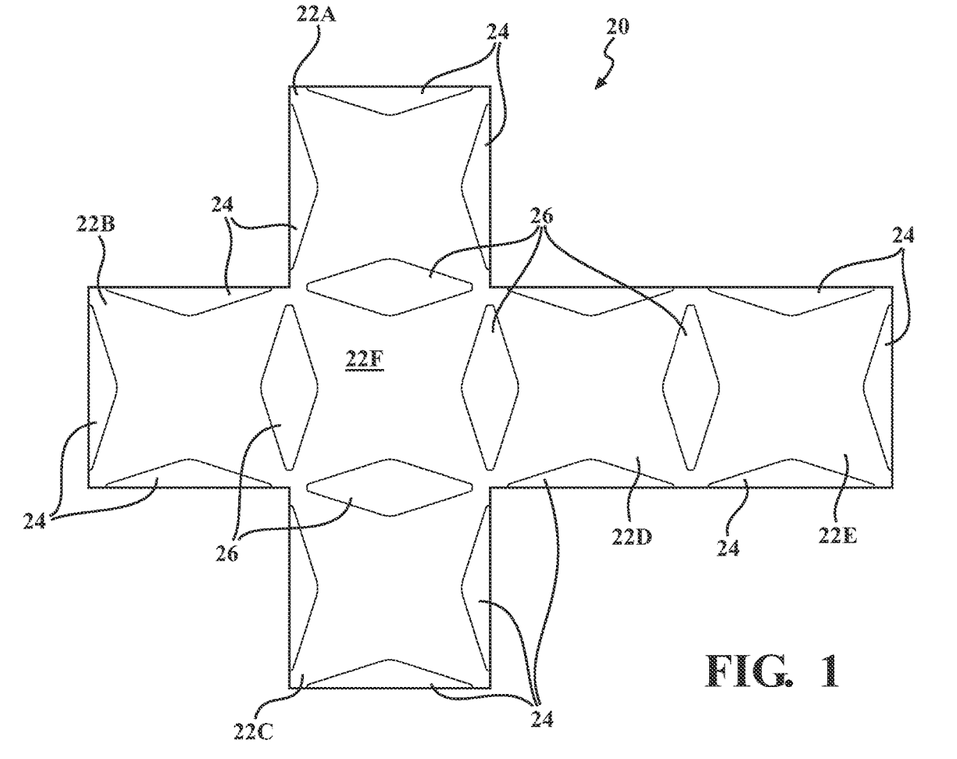
FIG. 1 illustrates an exemplary 2-D layout of a design for an aeromorph intended to exhibit a six-sided cube structure upon inflation.

For a more complete understanding of the technology, reference is made to FIG. 1, providing an exemplary 2-D layout of an existing design for an aeromorph 20 that is intended to exhibit a six-sided cube structure upon full inflation. For example, the aeromorph 20 includes a plurality of foldable segments 22A, 22B, 22C, 22D, 22E that are configured to move with respect to a base portion 22F to form a cubic structure. As shown in FIG. 1, the aeromorph 20 includes a plurality of shaped seams 24 and pneumatic hinges 26. While the sequence of folding may not be an important consideration for this particular shape, it is still required that each foldable segment bends in a certain direction in order to arrive at a cube shaped inflatable structure.

Figure 2A:
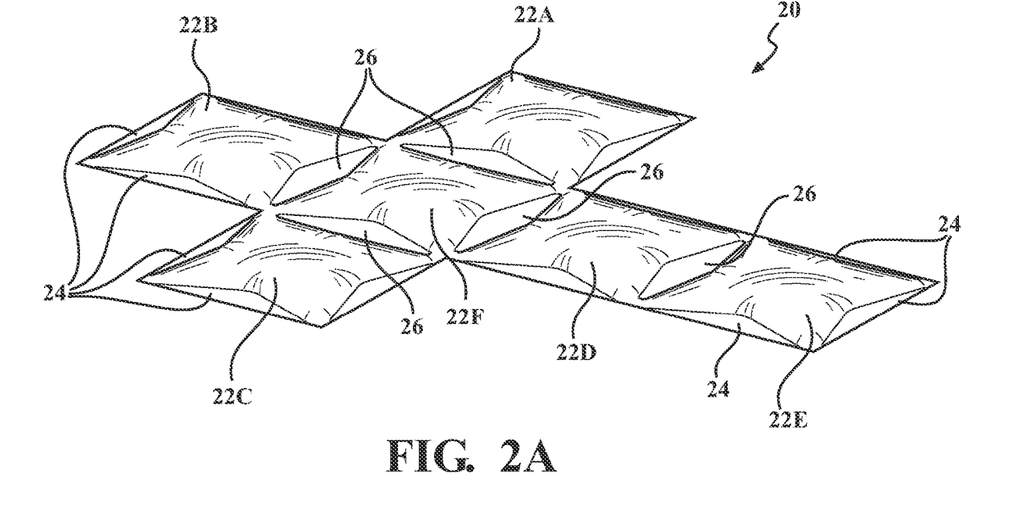
FIGS. 2A-2D illustrate a simulated animation of an aeromorph structure based on the design of FIG. 1 being inflated.
Figure 2B:
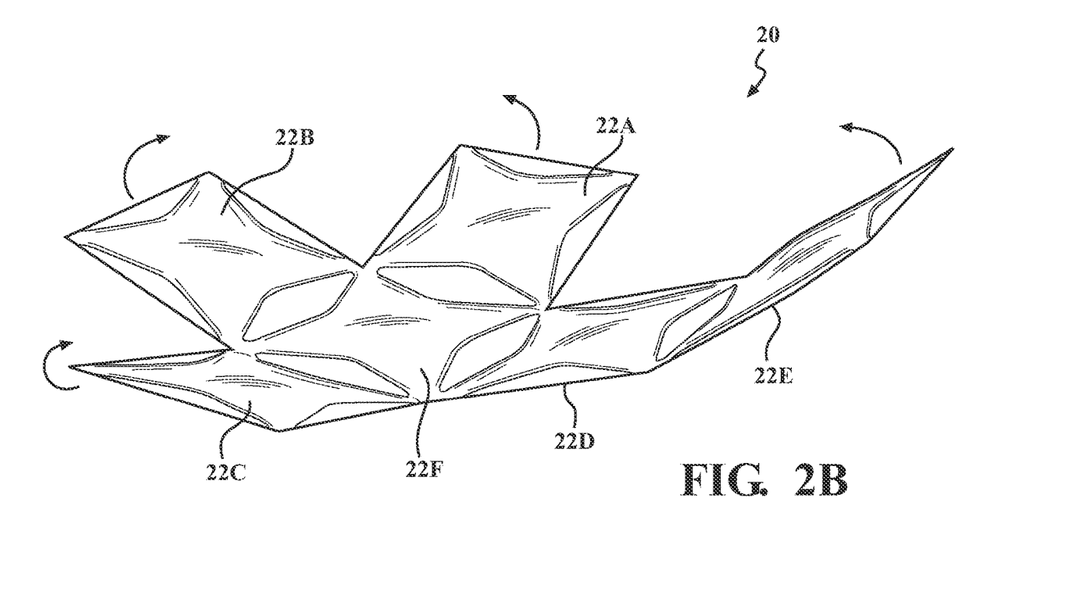
Figure 2C:
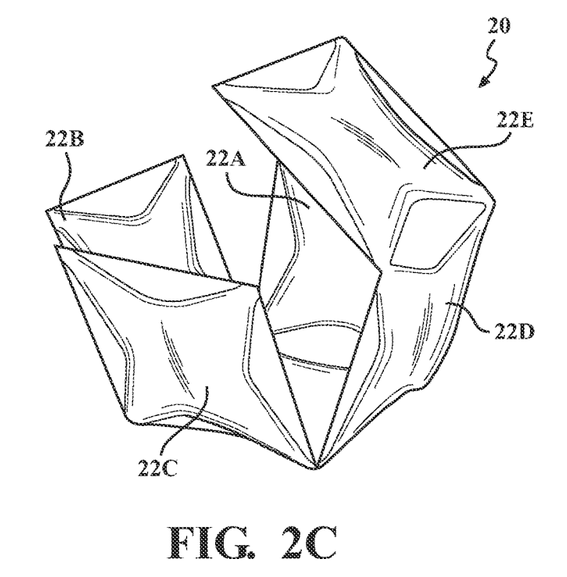
Figure 2D:
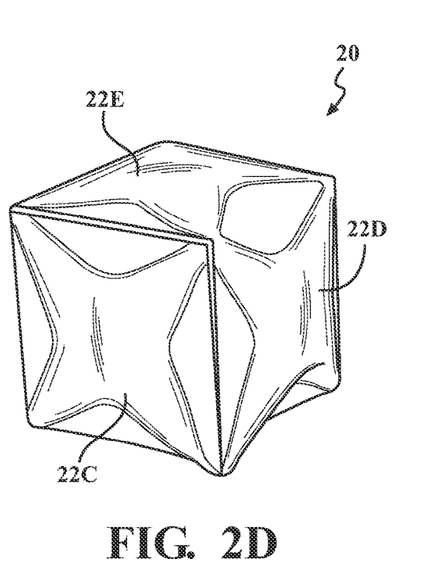

FIGS. 2A-2D illustrate a simulated animation of an aeromorph 20 based on the design of FIG. 1 being inflated and changing shape to ultimately form a six-sided cube shape structure. For example, FIG. 2A shows an initial stage, substantially flattened bladder, prior to inflation. FIG. 2B includes directional arrows and illustrates an initial bending movement of various side-extending foldable segments 22A, 22B, 22C, and 22D with respect to a base, or center segment (base portion 22F), as well as initial movement of outermost section (foldable segment 22E) with respect to middle section (foldable segment 22D). FIG. 2C illustrates the further movement that subsequently continues and provides the final cube shape structure as shown in FIG. 2D.

Figure 3:
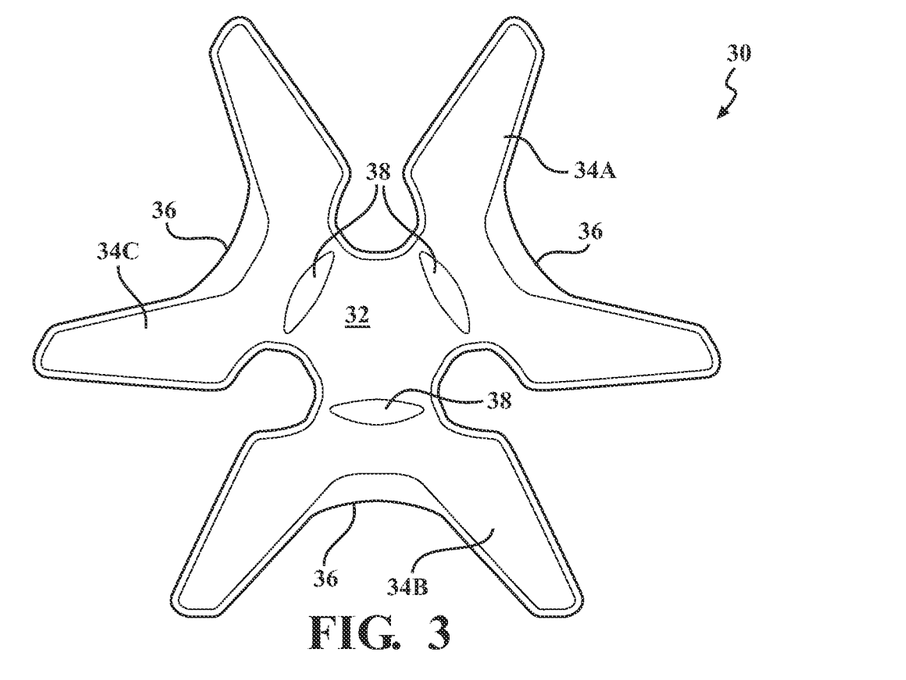
FIG. 3 illustrates an exemplary 2-D layout of a design for an aeromorph with three foldable segments and intended to exhibit a tripod structure upon inflation.

FIG. 3 illustrates an exemplary 2-D layout of another design for an aeromorph 30 having a center, or base segment 32, that is surrounded by three substantially C-shaped, foldable segments 34A, 34B, 34C, each having opposed feet/end portions. This aeromorph 30 is intended to exhibit a tripod-like structure upon inflation. In various aspects, the base segment 32 may be considered a non-folding segment, such that movement of the adjacent foldable segments is made in relation to a fixed position of the base segment 32. Notably, the shapes of aeromorphs that can be used with the present technology are not limited by the examples provided herein, and it is contemplated that the present technology can be used with many kinds of complex shapes and structures, formed of a variety of different kinds of programmable materials and provided with reinforcing features.

As shown in FIG. 3, non-limiting examples of the various seams 36 can be provided at locations along an outer perimeter of the aeromorph 30. It should be understood that certain of the seams 36 may be larger in size than others, and their shape and location can be customized based on the potential formation of wrinkles during the inflation process, assuming the particular programmable material does not stretch. A plurality of hinges 38 may be provided, with this particular design including at least one hinge 38 adjacent each foldable segment 34A, 34B, 34C. As is known to those skilled in the art, there are many factors that are used to develop and design seams, hinges, and other creases that, for the sake of brevity, are not discussed in full detail herein. Reference can be made to the non-patent literature article authored by Jifei Ou et al., titled "aeroMorph—Heat-sealing Inflatable Shape-change Materials for Interaction Design"

Oct. 16, 2016, incorporated by reference herein in its entirety, for a detailed review of various design considerations.

Figure 4:
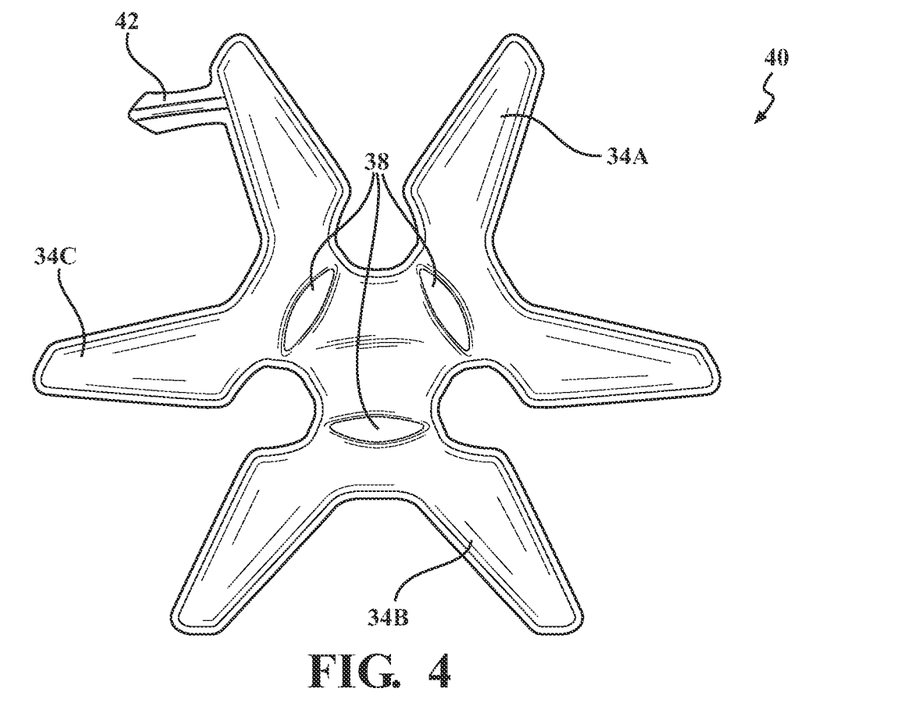
FIG. 4 illustrates a top perspective view of an aeromorph based on the design of FIG. 3 beginning to inflate, but without having any reinforcement member as provided in the present teachings.

FIG. 4 illustrates a top perspective view of an aeromorph 40, made according to the design of FIG. 3, beginning to inflate via a fluid inlet 42, but without having any reinforcement member as provided in the present teachings. As previously indicated, while consistency in the folding direction of foldable segments is desired, certain shapes and designs may be prone to inconsistent shape changes.

Figure 5A:
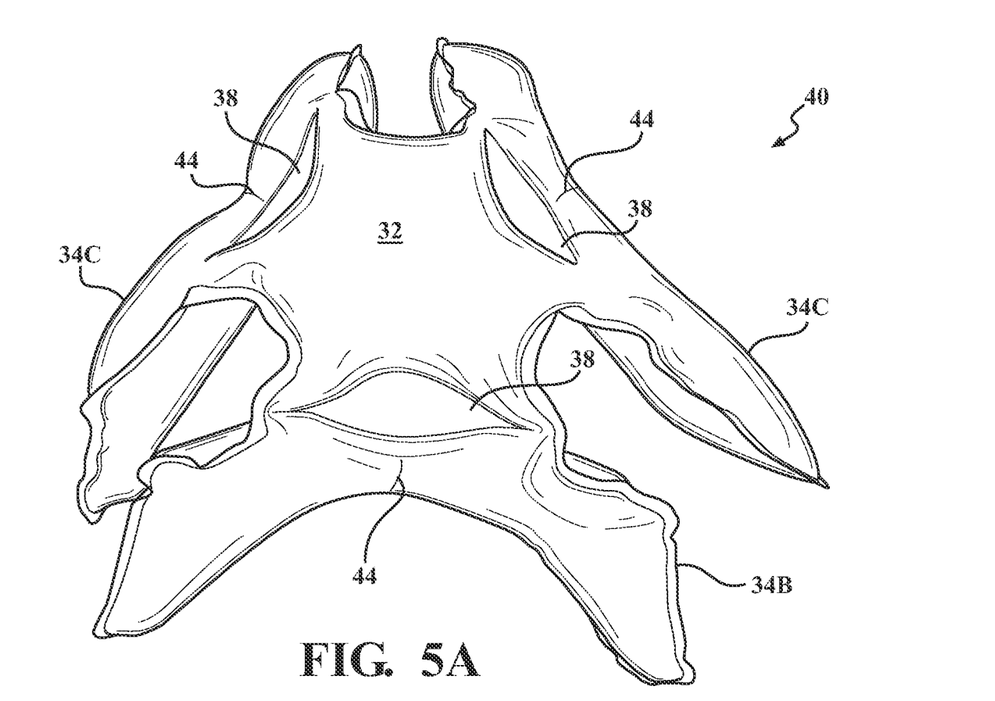
FIG. 5A illustrates a perspective view of the aeromorph of FIG. 4 fully inflated with all three foldable segments folded extending in the same direction.
Figure 5B:
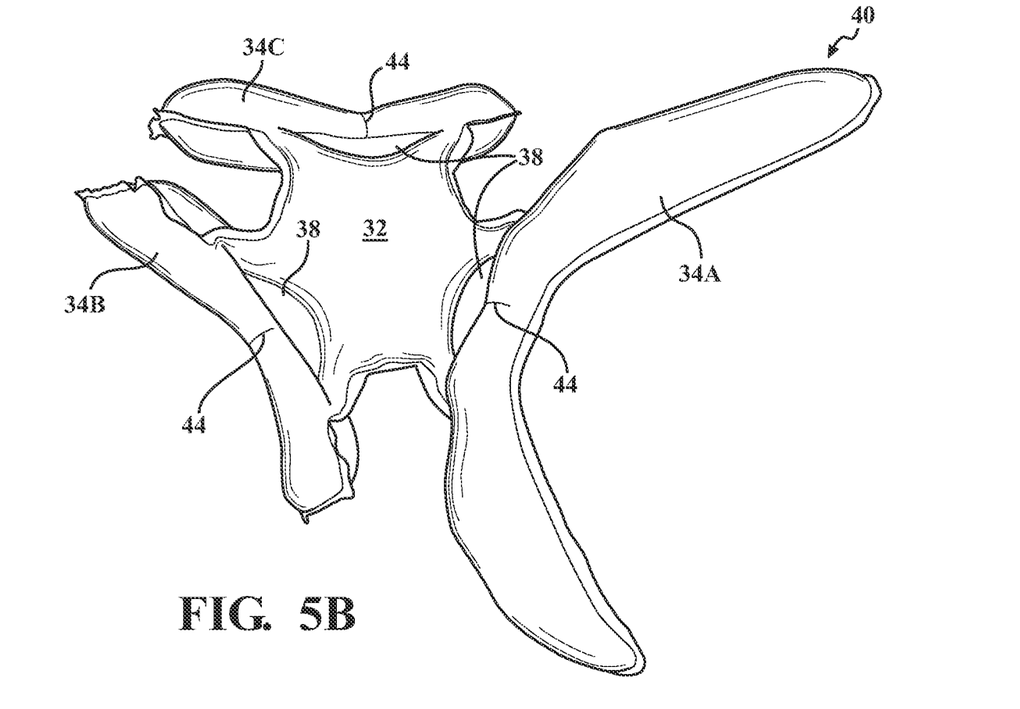
FIG. 5B illustrates a perspective view of the aeromorph structure of FIG. 4 fully inflated having two of the foldable segments folded in the same direction, and the third foldable segment in an undesired orientation.

The examples provided in FIGS. 5A and 5B show one example of such an undesirable inconsistency for a self-folding inflatable structure. For example, FIG. 5A illustrates a perspective view of the aeromorph 40 of FIG. 4 fully inflated with all three foldable segments 34A, 34B, and 34C folded and extending in the same direction with respect to the center segment 32. FIG. 5B, on the other hand, illustrates a perspective view of the aeromorph 40 of FIG. 4 fully inflated and having two of the foldable segments 34B, 34C folded in the same direction, while the third foldable segment 34A is shaped in an undesired orientation, bending in the opposite direction of the other foldable segments 34B, 34C. As shown in FIGS. 5A and 5B, various wrinkles 44 may form during the inflation process, which may have an adverse effect on the desired bending direction. For example, in this particular design, while the presence of wrinkles may be acceptable on what are referred to as the valley-side folds, which is on the underside of a curved area, the presence of wrinkles are not desirable on mountain-side folds, which is on the upper surface of a curved area.

The present technology proposes the use of various shaped stiffening materials, for example, referred to herein as reinforcing members, that can be secured to a surface of the aeromorph during, or even after, the manufacturing process. These reinforcing members are not only useful for guiding movement of the foldable segments in a desired direction, but can also influence a sequence of folding, as well as minimize the formation of wrinkles in certain areas, which can affect the shape management. In the broadest sense, any material that has a stiffness value (which can be measured by the Young's modulus of the material, or similar material property) greater than a stiffness value of the programmable material of the bladder can be useful as a reinforcing member. In various aspects, the present technology proposes the use of a polymer or resin, such as a thermoplastic polyurethane (TPU) or silicone rubber, as materials for reinforcing members. While there are various methods of incorporating the use of reinforcing members, the present technology generally focuses on providing the reinforcing members as extending beads of material on an exterior of the aeromorph structures, which can be applied using an additive manufacturing process, such as 3-D printing, and the like.

In various aspects, the reinforcing members may be secured to the aeromorphs before or after any seams, creases, and hinges are formed. With reference of FIG. 6, the methods of forming an inflatable structure with a plurality of chambers and segments that can be selectively shaped generally begins by assembling a bladder 50. The various methods may include providing two layers 52, 54 of a programmable material, each layer 52, 54 defining a respective exterior facing major surface 56 and an interior facing major surface 58. In terms of composition, the layers 52, 54 may be the same material or have different compositions. More than two layers may be provided with certain designs. Exemplary programmable materials include flexible paper, plastics, and various fabrics as are known in the art. In certain preferred aspects, the interior facing major surface 58 of each layer 52, 54 may include a polymer coating, such as a thermoplastic polyurethane, or other material that permits joining or securing multiple layers to one another, preferably using heat-sealing techniques, in order to provide airtight chambers or segments, as well as for creating strong seams, creases, and hinges. Various known fabrication techniques can be used for joining the two or more layers of the programmable material to form the bladder, and forming a plurality of seams in the bladder in order to define a plurality of foldable segments.

Figure 6:
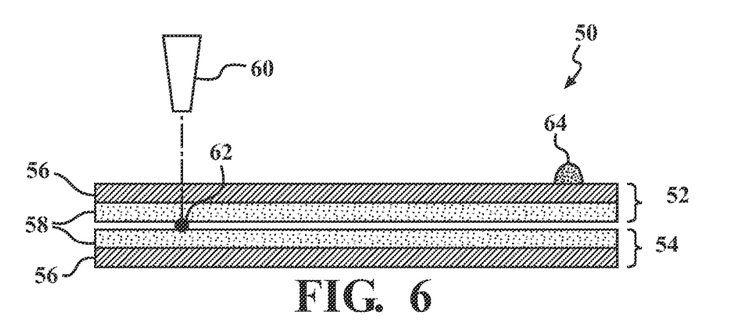
FIG. 6 is a schematic view of a seam being formed, securing two layers of a programmable material that will ultimately form a bladder with foldable segments.

FIG. 6 generally illustrates a robotic heat source 60 that can be used to direct heat to the bladder 50 and form the various seams 62. As used herein, a seam can be used to join two materials or layers together to form a plurality of chambers, as well as to create a segment of a pneumatic hinge. In various aspects, the step of forming a plurality of seams may include creating seams using one of a heat press sealing technique and a robotic sealing technique. Of course, the seams may also be created manually. As is known in the art, the bending direction of the foldable segments may depend on, or can be influenced by, the side of the material on which the heat treatment is applied. Thus, more than one application of heat treatment may be required to achieve certain bi-directional bending, especially if there is a multiple layered programmable substrate. In various aspects, the heat treatment may be applied to both layers of programmable material 52, 54, for example, applied to both opposing exterior facing surfaces of the programmable substrate.

The methods may include one or more steps of defining a plurality of hinges configured to permit a folding movement of the respective foldable segments. In various aspects, the hinges may be formed at the same time as the other seams are made, or the manufacturing process can include the making of the hinges as a separate step. In various aspects, the hinges may be a combination of seams of various freeform shapes, generally including linear, arc shaped, diamond shaped seams, etc. The methods further include depositing at least one reinforcing member 64 on at least a portion of one of the exterior facing major surfaces 56, with the reinforcing member 64 generally exhibiting a stiffness greater than a stiffness of a layer 52, 54 of the programmable material. As discussed herein, the reinforcing member 64 is preferably located and configured to guide a directional movement of at least one of the plurality of foldable segments and control a final shape of the inflatable structure.

Figure 7A:
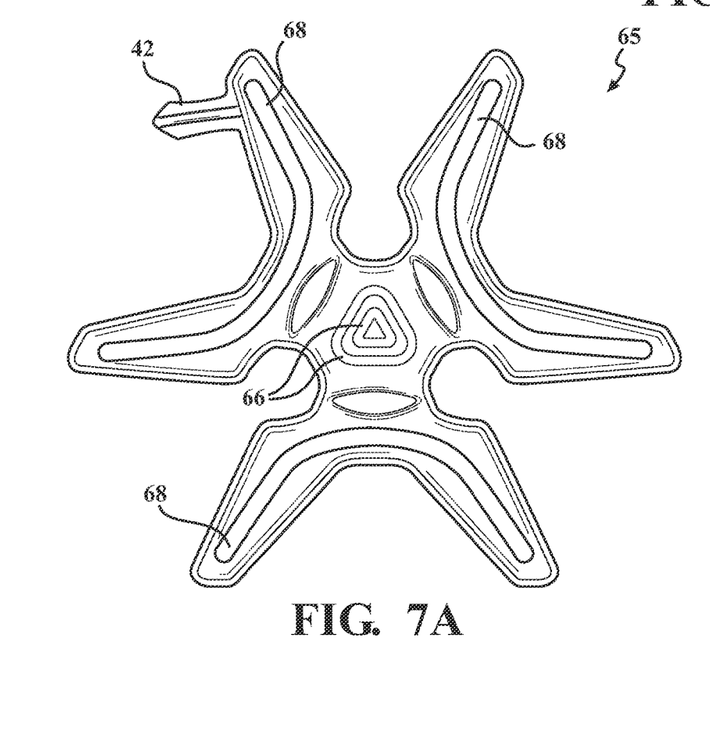
FIG. 7A illustrates a top plan view of an aeromorph based on the design of FIG. 3, with a plurality of reinforcing members printed on an exterior surface.

FIG. 7A illustrates a first top plan view of an exemplary aeromorph 65 based on the design as provided in FIG. 3. As shown, the aeromorph 65 may be provided with a plurality of reinforcing members printed on an exterior surface thereof. As specifically shown, the center, non-folding segment 32 is provided with a pair of exemplary reinforcing members 66, shaped as concentric circles. Although the center segment 32 is referred to as non-folding with respect to the other sections, the reinforcing members 66 provided here may be useful for suppressing or minimizing the formation of wrinkles in the programmable substrate, the presence of which may adversely influence a folding direction of other foldable segments. The three foldable segments 34A, 34B, 34C are provided with a single reinforcing member 68, generally curved in shape, and commensurate with the overall shape of a perimeter of the foldable segments. In various aspects, the attachment of reinforcing members adjacent a perimeter of one of the foldable segments urges a convex folding of the foldable segment.

Figure 7B:
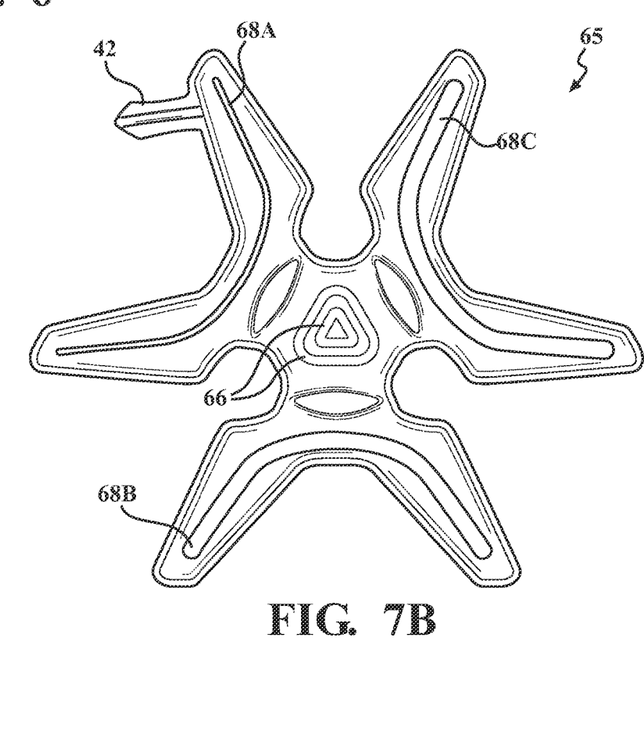
FIG. 7B illustrates a top plan view of an aeromorph based on the design of FIG. 3, with a plurality of reinforcing members having a variable thickness printed on an exterior surface.

The reinforcing members 68 can be formed, printed, or otherwise deposited as continuous, extending beads of material (as shown), or they can be discontinuous formations. Generally, the shape, size, and material of each of the reinforcing members 66, 68 can be selected and designed to provide a specific stiffness. For example, FIG. 7B illustrates a second top plan view of an aeromorph 65 based on the design of FIG. 3, with a plurality of reinforcing members 68A, 68B, 68C each having a different thickness and formed or printed on an exterior surface thereof. In addition to the different shapes, sizes, and thicknesses of the plurality of reinforcing members 68, or as an alternative aspect, the different reinforcing members may be made of different compositions, such that each exhibits a different stiffness. By providing different regions with different stiffness properties, it becomes possible to control a sequence of folding events. In various aspects, providing reinforcing members with different stiffness values allows the aeromorphs to be designed such that the foldable segments having reinforcing members of a lower stiffness value will bend and shape prior to foldable segments having reinforcing members of a higher stiffness value. Thus, for example, methods of manufacture may include depositing a first reinforcing member having a first stiffness value on an exterior facing major surface of a first foldable segment, and depositing a second reinforcing member having a second stiffness value, greater than the first stiffness value, on an exterior facing surface of a second foldable segment. Thereafter, during the inflation, the first and second foldable segments move in a sequence, where the first foldable segment bends before the second foldable segment.

Figure 8A:
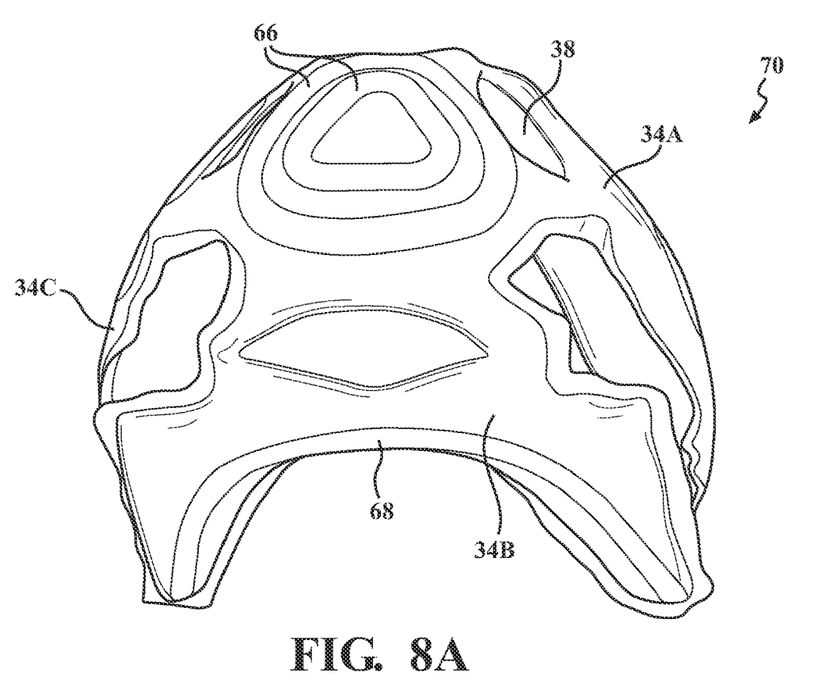
FIG. 8A illustrates a top perspective view of the aeromorph of FIG. 7A fully inflated with all three foldable segments folded in the same direction.
Figure 8B:
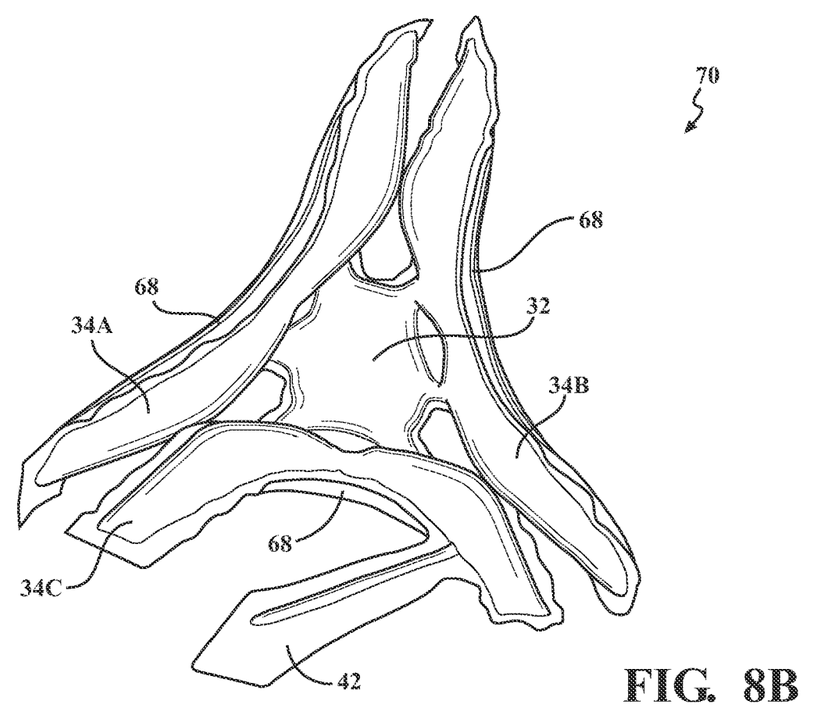
FIG. 8B illustrates a bottom perspective view of the aeromorph of FIG. 7A fully inflated with all three foldable segments folded in the same direction.

FIG. 8A illustrates a top perspective view of an aeromorph 70 of FIG. 7A fully inflated, with the reinforcing members 68 configured for guiding all three foldable segments 34A, 34B, 34C to be folded in the same direction with respect to the center, non-folding segment 32. FIG. 8B illustrates a bottom perspective view of the aeromorph of FIG. 7A fully inflated. As shown in FIGS. 8A and 8B, the wrinkles 44 that were previously present on the mountain side of the foldable segments (FIG. 5A) are minimized or no longer present.

As is known in the art, various software, simulation, and interface tools can be useful for designing and creating a combination seams, creases, and hinges of various geometries, dimensions, and specifications to control how a programmable material bends and changes shape. It is envisioned that such software, simulation, and interface tools can also ultimately be programmed to take into consideration the use of the various reinforcing members, as provided with the present technology, and to use the reinforcing members in consideration with the programming of an aeromorph to change into a final ultimate shape after inflation in a programmable sequence.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. An inflatable structure with shape controlling features, the inflatable structure comprising:
   a bladder formed of a programmable substrate and defining an outer perimeter, the bladder including:
      a plurality of seams;
      a plurality of foldable segments defined by the plurality of seams;
      at least one hinge located adjacent each foldable segment and configured to permit a folding movement of the respective foldable segment; and
      at least one reinforcing member secured to an exterior surface of the bladder and configured to guide a directional movement of at least one of the plurality of foldable segments, control a shape of the inflatable structure, and determine a sequence of folding, the at least one reinforcing member having a stiffness greater than a stiffness of the bladder, and the at least one reinforcing member including an extending bead of material.

2. The inflatable structure according to claim 1, wherein the at least one reinforcing member comprises a plurality of reinforcing members secured to the exterior surface of the bladder.

3. The inflatable structure according to claim 2, wherein the plurality of reinforcing members comprises a first reinforcing member having a first stiffness value and secured to a first foldable segment, and a second reinforcing member having a second stiffness value, greater than the first stiffness value, and secured to a second foldable segment.

4. The inflatable structure according to claim 3, wherein during inflation, the foldable segments move in a sequence, where the first foldable segment bends before the second foldable segment.

5. The inflatable structure according to claim 1, wherein the at least one reinforcing member comprises one of a thermoplastic polyurethane and a silicone rubber.

6. The inflatable structure according to claim 1, wherein the at least one reinforcing member is disposed adjacent to a portion of the outer perimeter of the bladder.

7. The inflatable structure according to claim 1, wherein the bladder comprises at least one non-foldable segment, the at least one non-foldable segment comprising at least one other reinforcing member secured thereto and configured to suppress a formation of wrinkles on the non-foldable segment.

8. The inflatable structure according to claim 1, wherein the at least one reinforcing member urges a convex folding of the at least one of the plurality of foldable segments.

9. The inflatable structure according to claim 1, wherein the at least one reinforcing member comprises a series of aligned reinforcing members.

10. The inflatable structure according to claim 1, wherein the programmable substrate of the bladder comprises two layers of a programmable material joined together, each layer defining an exterior facing major surface and an interior facing major surface, with each interior major surface comprising a thermoplastic polyurethane.

11. A method of forming an inflatable structure with a plurality of chambers that can be selectively shaped, the method comprising:
providing two layers of a programmable material, each layer defining an exterior facing major surface and an interior facing major surface, with each interior major surface comprising a thermoplastic polyurethane;
joining the two layers of the programmable material to form a bladder;
forming a plurality of seams in the bladder to define a plurality of foldable segments;
defining a plurality of hinges configured to permit a folding movement of the respective foldable segments; and
depositing at least one reinforcing member on a portion of one of the exterior facing major surfaces, the reinforcing member exhibiting a stiffness greater than a stiffness of the programmable material, and being configured to guide a directional movement of at least one of the plurality of foldable segments, control a shape of the inflatable structure, and determine a sequence of folding, and the at least one reinforcing member including an extending bead of material.

12. The method according to claim 11, wherein the step of depositing the at least one reinforcing member on one of the exterior facing major surfaces comprises using an additive manufacturing technique to deposit one of a thermoplastic polyurethane and a silicone rubber.

13. The method according to claim 12, comprising 3-D printing the reinforcing member adjacent a perimeter of one of the plurality of foldable segments in order to urge a convex folding of the one of the plurality of foldable segments.

14. The method according to claim 11, wherein the step of forming a plurality of seams comprises creating seams using one of a heat press sealing technique and a robotic sealing technique.

15. The method according to claim 11, wherein at least one of the exterior facing major surfaces of the programmable material comprises nylon.

16. The method according to claim 11, wherein forming a plurality of seams to define a plurality of foldable segments further comprises forming at least one non-foldable segment, the at least one non-foldable segment comprising at least one other reinforcing member configured to suppress a formation of wrinkles on the non-foldable segment.

17. A method of controlling a sequence of folding a plurality of segments of an inflatable structure, the method comprising:
joining two layers of a programmable material to form a bladder;
forming a plurality of seams in the bladder to define a plurality of foldable segments;
defining a plurality of hinges configured to permit a folding movement of the respective foldable segments;
depositing a first reinforcing member having a first stiffness value on an exterior facing major surface of a first foldable segment; and
depositing a second reinforcing member having a second stiffness value, greater than the first stiffness value, on an exterior facing surface of a second foldable segment,
wherein during inflation, the first and second foldable segments move in a sequence, where the first foldable segment bends before the second foldable segment,
the first stiffness value and the second stiffness value are greater than a stiffness of the bladder, and at least one of the first reinforcing member and the second reinforcing member including an extending bead of material.

18. The method according to claim 17, wherein the first and second reinforcing members comprise different materials.

19. The method according to claim 17, wherein the first and second reinforcing members are deposited in different amounts.

20. The method according to claim 17, wherein at least one of the first and second reinforcing members urges a convex folding of respective foldable segment.

* * * * *